United States Patent [19]

Leroux et al.

[11] Patent Number: 4,926,763
[45] Date of Patent: May 22, 1990

[54] METHOD AND DEVICE FOR MANUFACTURING CHARCOAL

[75] Inventors: Andre-Jean Leroux, Brebières; Claude Mercier, Chemin des Marlieres, 59553 Lambres les Douai, both of France

[73] Assignee: Claude Mercier, Lambres les Douai, France; a part interest

[21] Appl. No.: 297,409

[22] Filed: Jan. 17, 1989

[30] Foreign Application Priority Data

Mar. 1, 1988 [FR] France ............................ 88 02520
Apr. 14, 1988 [FR] France ............................ 88 04928

[51] Int. Cl.$^5$ ............................................. F23J 15/00
[52] U.S. Cl. ................................ 110/215; 110/224; 110/238; 202/93
[58] Field of Search .............. 110/224, 225, 229, 208, 110/215, 216, 238

[56] References Cited

U.S. PATENT DOCUMENTS

| | | | |
|---|---|---|---|
| 3,977,947 | 8/1976 | Pyle . | |
| 4,280,878 | 7/1981 | Sprenger . | |
| 4,311,103 | 1/1982 | Hirose | 110/224 |
| 4,354,825 | 10/1982 | Fisher et al. | 110/224 |
| 4,375,959 | 3/1983 | Powell | 110/224 |
| 4,568,425 | 2/1986 | Putnam | 110/224 |
| 4,579,069 | 4/1986 | Gray et al. | 110/224 |
| 4,583,470 | 4/1986 | Hirose | 110/224 |
| 4,692,113 | 9/1987 | Tokai et al. | 110/215 |
| 4,821,653 | 4/1989 | Jones | 110/224 |

FOREIGN PATENT DOCUMENTS

| | | |
|---|---|---|
| 884236 | 8/1943 | France . |
| 897642 | 3/1945 | France . |
| 2588484 | 4/1987 | France . |

Primary Examiner—Henry C. Yuen
Attorney, Agent, or Firm—Oblon, Spivak, McClelland, Maier & Neustadt

[57] ABSTRACT

A charcoal manufacturing device includes at least two bottomless furnaces of which, in operation, at least one is in a carbonization phase and at least one other is charged with wet wood to be dried. An incinerator is provided for burning the gas produced during the carbonization phase, connected to the at least one furnace. A first hot gas diluter is connected to this incinerator and an extractor is connected to the first diluter. An optional washing device is connected to the extractor. Hot gas produced by the at least one furnace during the carbonization phase is drawn off upstream of the extractor and conveyed to the at least one other furnace by a system that includes a second hot gas diluter. This second diluter renders the temperature of the hot gas compatible with the wet wood to be dried.

13 Claims, 3 Drawing Sheets

METHOD AND DEVICE FOR MANUFACTURING CHARCOAL

BACKGROUND OF THE INVENTION

1. Field of the invention

The present invention concerns a rational installation for manufacturing charcoal coupled to a system for eliminating fumes by incineration-aspiration and washing, and a manufacturing method using an installation of this kind.

The invention is also directed to using a single installation for successively carbonizing and drying the wood and discharging the charcoal manufactured.

2. Description of the prior art

The relatively small number of carbonization sites on which the wood is pre-dried are obliged to carry out lengthy and numerous handling operations using powerful and costly forklift trucks.

The applicants have discovered that it is possible to reduce the number of furnaces by one third and that it is sufficient to use a small conventional forklift truck instead of the extremely powerful forklift trucks previously needed to move the heavy filled furnaces.

There is a proportionate saving in labor, not to mention the elimination of time wasted in unnecessary handling operations.

One modern technique used to carbonize wood without pollution is to burn the gas resulting from carbonization in an incinerator.

The present invention makes it possible to capitalize on the cost-free heat energy produced by burning this gas for ancillary purposes, such as heating, and also, and most importantly, direct use of this heat energy to dry the wood before it is converted into charcoal in the same furnace, without any handling operations and merely by the manipulation of two valves.

The moisture content of the wood has a significant effect on the carbonization, the ideal wood for carbonization being anhydrous.

In practise, carbonization is possible with moisture contents up to 25 or 30%, but with these moisture contents a significant quantity of wood is necessarily burnt to eliminate the water from the remainder, and therefore wasted.

The total carbonization time is easily doubled in this case.

This wastage in terms of materials and time is naturally increased when the moisture content is even higher.

It is therefore imperative to dry the wood.

Natural drying as used until now required storage for at least one year if the geographical situation of the site was good, a large surface area, and good exposure to the sun and wind.

Consequently, the size of the investment tied up in this way was considerable.

A method for drying the wood without costly input of heat energy should therefore significantly reduce operating overheads through savings in time and raw materials to make the installation more profitable.

One object of the invention is therefore a device for manufacturing charcoal enabling harmful fumes to be eliminated and capitalizing on the heat energy produced in this way.

Another object of the invention is a method of manufacturing charcoal using a device of this kind.

SUMMARY OF THE INVENTION

In one aspect, the invention consists in a charcoal manufacturing device comprising at least two bottomless furnaces of which, in operation, at least one is in a carbonization phase and at least one other is charged with wet wood to be dried, an incinerator for burning gas produced during the carbonization phase connected to said at least one furnace, a first hot gas diluter connected to said incinerator, an extractor connected to said first diluter, an optional washing device connected to said extractor, means for taking off hot gas produced by said at least one furnace during the carbonization phase upstream of said extractor, said take-off means being connected to said at least one other furnace, and a second hot gas diluter in said take-off means adapted to render the temperature of said hot gas compatible with said wet wood to be dried.

The furnaces used in accordance with the invention have the particular feature of being bottomless, the wood resting directly on a slab, specifically of refractory concrete.

According to the invention, the upper part of the furnace in the carbonization phase is equipped with a retractable sleeve chimney having two channels of which one directs the hot gas to an incinerator when the furnace is in the carbonization phase.

This chimney is linked through the incinerator to an extractor device producing a drop in pressure at the top of the furnace and in the incinerator.

The gas from the furnace enters the incinerator at a temperature of approximately 300° C. and is burnt using a low-consumption pilot burner with sufficient additional oxygen to ignite the gas. After a few moments of operation the pilot flame is no longer needed and the gas present continues to burn unaided. In this case the temperature of the incinerator reaches values in the order of 800° to 1 000° C.

The pipe at the outlet from the incinerator is fitted with a conical diluter adapted to take in a sufficient quantity of air to reduce the temperature at the incinerator outlet, which is in the order of 900° to 1 000° C., to a temperature of approximately 200° C. or less.

The flow cooled in this way, laden with combustion residues, smuts or miniscule solid particles, is passed into a washing column which removes these solid particles in suspension.

This washing column is preferably partially immersed in a receiving tank the water surface of which forms an hydraulic trap. This device obliges the pressurized gas to leave through the take-off chimney.

The washing device is equipped with means for recycling the washing water continuously to the sprayers. Also, a float valve maintains a constant level in the tank and enables the tank to be topped up as necessary due to losses through evaporation.

The gas extracted from the system is finally exhausted to the atmosphere, after the various solid particles have been removed from it in the spray of water.

The pipe at the incinerator outlet includes a branch connection for direct take-off of gas to dry the wood. These branch connections are joined to distribution trunking equipped with a fan and conveying the hot gas, after optional dilution, to a furnace filled with wet wood.

The furnace serving as a drying device includes in its lower part a hot gas inlet preferably formed in the slab supporting the furnace in question.

A shut-off valve system equipping the retractable sleeve chimney fixed to the top of the furnace is in this case open to the atmosphere in order to exhaust the drying gas after it has passed through the wood.

As previously, the branch connection includes at the gas take-off at the incinerator outlet a diluting device comprising a conical diluter by means of which the temperature of 900° to 1 000° C. at the incinerator outlet can be reduced to a temperature below that at which wood ignites, in the order of 150° C.

This device for adding cool air may be adjusted by altering the position of the diluter cone relative to a male part fitted to the pipe at the incinerator outlet.

In this embodiment it is possible to use almost 20% of the heat energy produced at the incinerator outlet for drying the wood.

According to the invention, it is possible to add other conical diluters in order to take off hot gas for other applications, notably for domestic or industrial heating, heating greenhouses or any other use with or without heat-conducting liquid/air heat exchangers, or to produce roasted wood.

The furnaces used according to the invention are equipped with a telescopic metal frame in two parts. The first frame part is fixed to the periphery of the furnace and the other frame part carries a set of four wheels running on rails fixed to a general distribution frame. The two frame parts are adjusted relative to each other by four actuators, one at each corner.

By this means the furnace may rest in an airtight way on the ground or be raised slightly, suspended from the rolling frame. The whole then becomes mobile on the rails and enables the charcoal manufactured and resting on the slab to be moved without undue force.

To the side of the furnace, in line with the rails, is a ditch in which is a container of sufficient volume to receive all of the charcoal produced by the furnace.

According to the invention, after the carbonization phase the furnace is shut off to avoid disturbing the gas contained in the manifold from the other furnace(s) in the carbonization phase. The furnace is separated from the installation after the wood is carbonized.

After the furnace is raised, it is moved on the rails towards the ditch. The charcoal slides on the ground and is tipped into said container. Once discharging is completed, the furnace is returned to its original position and after the actuators are disengaged the furnace is ready for a new operation.

According to the invention, the furnace is equipped with a tubular column ending at the top in a right-angle boom fixed to the lid of the furnace. This column slides in a sleeve of larger cross-section to enable it to rise and pivot to transmit the disengagement and the retraction of the lid, which is inserted into a sealing groove of the furnace. A small hydraulic jack at the base of the boom provides for the vertical variation and a handle fixed to the column enables the operator to impart gyratory movement to the lid. The latter can therefore be disengaged to provide access to the lining of wood.

At the same time, an airtight cover is attached to the container to snuff out the still incandescent charcoal.

The container full of charcoal is moved to a cooling off area and another empty container put in its place to undergo the same operation when discharging the second furnace.

In another aspect, the invention consists in a method of manufacturing charcoal in which:
wet wood is loaded into at least one furnace;
dried wood is carbonized in at least one other furnace;
an extractor passes the gas produced by carbonizing said dried wood to an incinerator for burning said gas;
the hot gas produced by said incinerator is in part washed, after dilution, in a washing tower and in part recycled, after diluting with air to reduce the temperature of the gas from that at the incinerator outlet to a value below that at which wood ignites, to said at least one furnace containing said wet wood, in order to dry said wet wood.

In one variant of the invention, the furnace is detached from its base at the end of the carbonization process and moved to a container in a ditch adapted to receive the charcoal produced therein, which container is closed in a airtight way when it has been loaded, to snuff out the incandescent charcoal.

In another variant of the invention, some of the hot gas from the incinerator is diverted to heating plant for use therein, in particular for domestic or industrial heating, heating greenhouses and other uses.

The invention will now be described in more detail by way of non-limiting example only and with reference to the appended diagrammatic drawings.

DESCRIPTION OF THE PREFERRED EMBODIMENT

Figure 1:
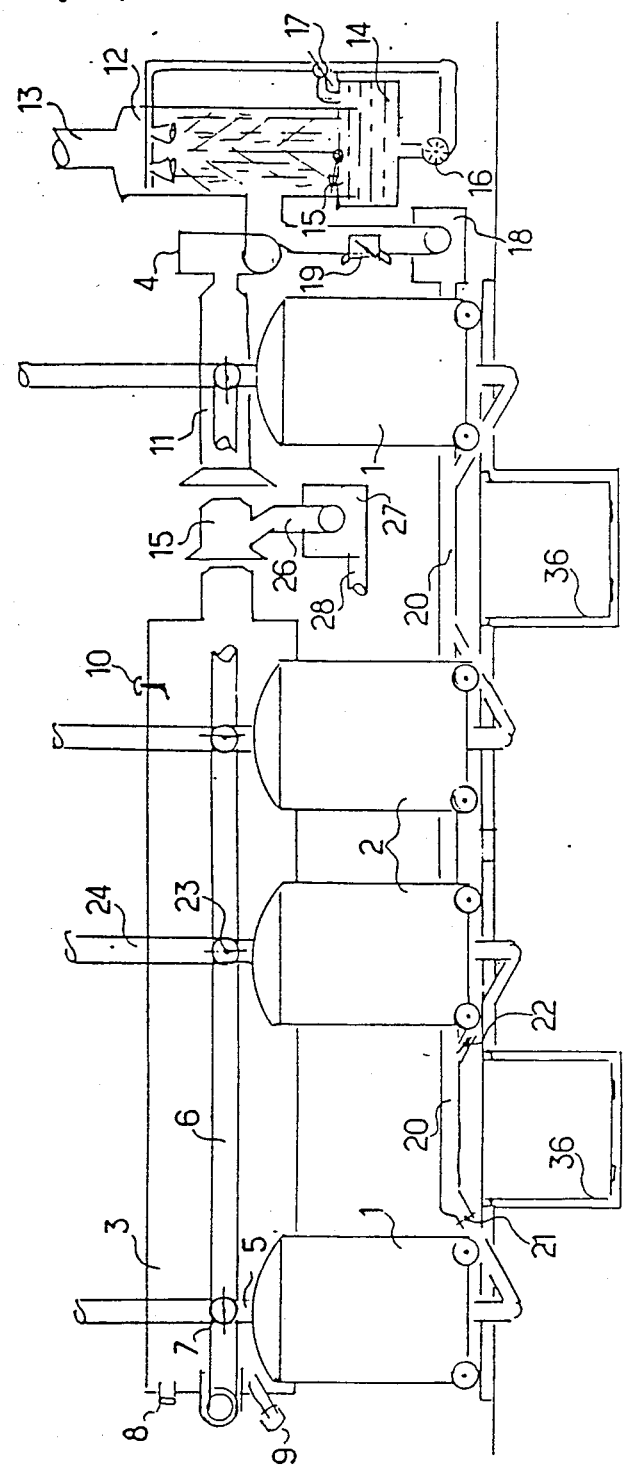
FIG. 1 is a general representation of the installation.

The furnace 1 resting on the refractory slab is fired up for carbonization. Because of the pressure reduction caused by a fan 4, the gas resulting from carbonization is drawn into a chimney 5 of the furnace and then guided into an inlet manifold 6 through a valve 7.

This gas, which has a high calorific value, ignites in an incinerator 3 in the presence of combustion-supporting air drawn in through an adjustable intake 8. This combustion is spontaneous when the incinerator is at its operating temperature or initiated by means of an igniter torch 9 temperature-regulated by means of a thermocouple 10 at the end of the incinerator.

The destruction of the gas by burning it produces a temperature that remains at all times between 900° and 1 000° C.

The fan 4 would normally be unable to withstand this temperature without rapidly sustaining damage.

Its power is therefore calculated with a large safety margin so as to draw in a very large quantity of cool secondary air by means of a conical diluter 11.

The temperature of the extractor fan 4 therefore never exceeds 200° C. in operation, even though the temperature in the extraction passage at the outlet from the incinerator is 1 000° C.

At this temperature the pyroligneous gas is totally destroyed, none of its constituents remaining at temperatures above 650° C.

The air passing through the fan, still laden with combustion residues, "smuts" or miniscule solid particles can cause dust to accumulate. Before being exhausted to the atmosphere, this flow is passed into a washing tower 12 to have these solid particles still in suspension removed from it.

The washing column is partially immersed in a receiving tank 14 the water surface of which forms an hydraulic trap.

This system obliges the pressurized gas to leave through an evacuation chimney 13.

A pump 16 recycles the washing water continuously to the sprayers.

This flow is controlled by a three-way valve 17.

An ancillary float valve device 15 maintains a constant level in the tank and enables topping up as necessary due to losses caused by evaporation.

The gas extracted from the system is finally exhausted to the atmosphere through the chimney 13, totally cleaned through having had the solid particles removed in the flow of sprayed water.

These particles are subsequently scraped off from the surface of the tank in the form of foam.

At the outlet from the fan 4 is a hot gas branch connection which does not pass through the washing column and from which hot gas for drying is taken off directly.

Hot gas drawn off from the incinerator via the extractor fan 4 is blown into the distribution trunking 20 by a fan 18.

The valve 21 corresponding to the furnace 1 in the carbonization phase is shut off.

On the other hand, the valve 22 on the drying furnace 2 is open.

At the inlet to the fan 18 is a secondary cool air intake 19 with an adjustable flap operated by a regulator motor.

The regulator motor is controlled directly by a temperature probe in the trunking. The excessively hot gas from the incinerator can therefore be cooled by adding cool air.

Although cleaned by the incinerator, this gas has not passed through the water column.

First of all, mixing the gas with cool air minimizes this drawback.

Also, on passing into the furnace 2 containing the wood to be dried the gas is subject to natural filtration which traps the solid particles.

It is therefore gas laden only with water vapor but free of dust that is exhausted to the atmosphere by the chimneys 24 opened by the valve 23.

The quantity of heat energy used for drying remains extremely limited. For an equivalent flowrate of the fans 4 and 18 the temperature drops from approximately 1 000° C. to 150° C. in the drying trunking.

This temperature reduction is achieved by adding cooler ambient air by means of a diluter cone.

The female funnel cone is adjustable in position relative to the male spike cone.

Varying the position of the mobile cone changes the proportions of the hot gas/cool air mixture and a constant temperature range can be achieved in a relatively precise way.

The heat energy used for drying represents approximately 20% of that produced.

One or more identical intermediary systems may be used to exploit the remaining heat energy available.

To this end, a diluter 25 and its trunking 25 are included to convey hot gas to the fan 27 which directs it to an outlet 28 from which it is taken off to use its heat energy.

These uses are multiple: domestic or industrial heating, heating greenhouses, multiple uses with or without heat-conveying liquid/air heat exchangers, producing roasted wood, etc.

Figure 2:
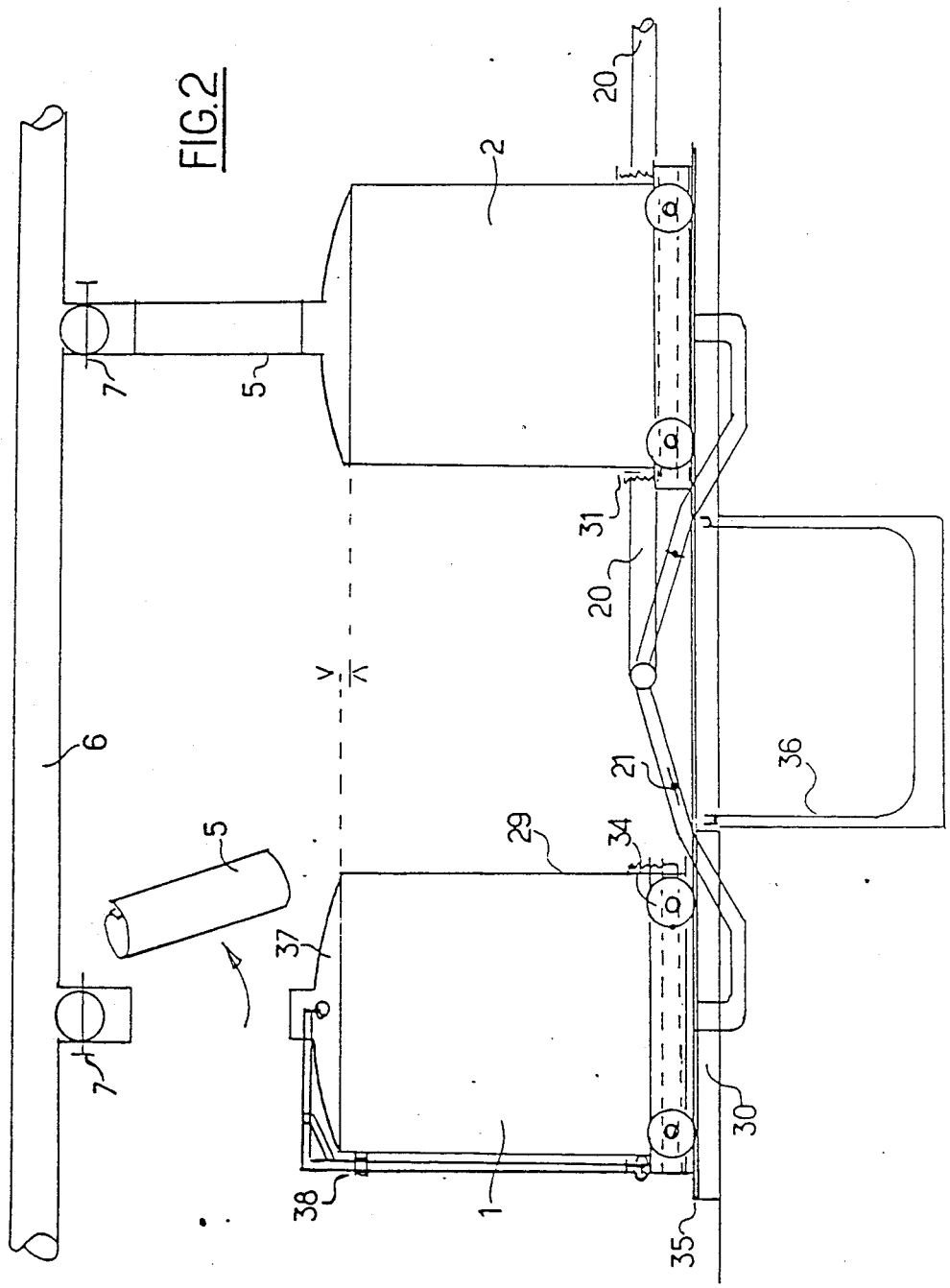
FIG. 2 shows a standard module comprising two furnaces on frames and a snuffing container at a lower level.
Figure 3:
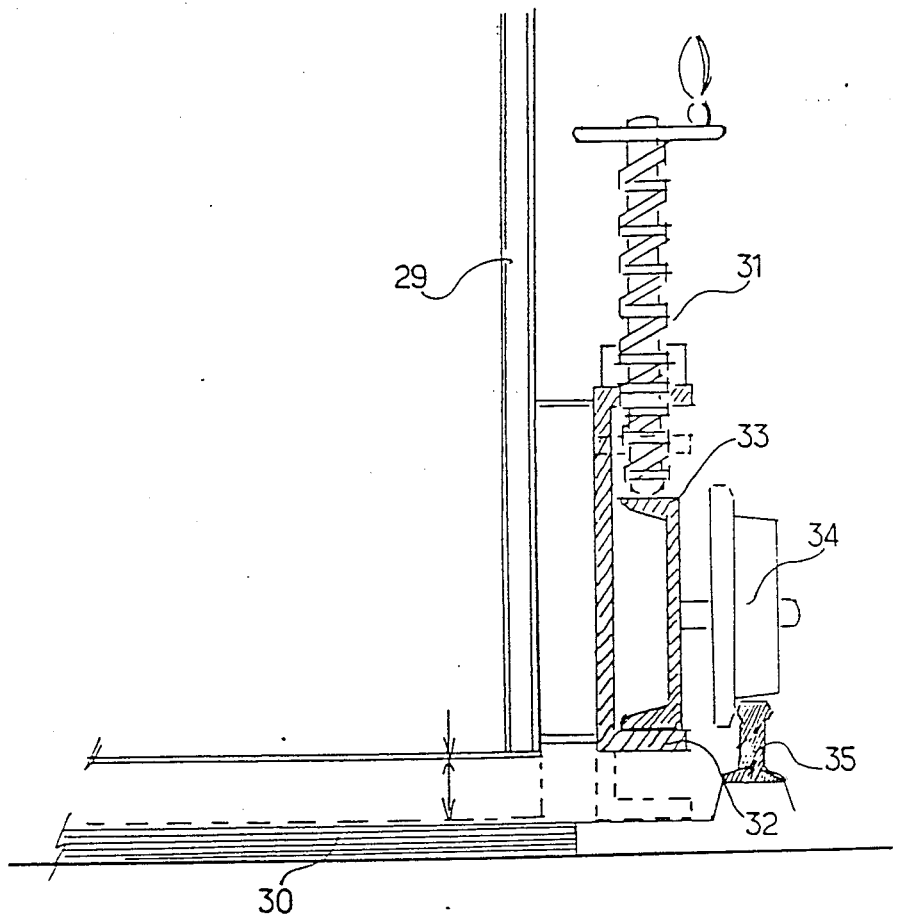
FIG. 3 shows a detail of the system for raising and lowering the furnaces.

This completes the description of the path of the gas, and reference should now be had to FIGS. 2 and 3 relating to the functioning of the combined furnace.

Carbonization having been finished in the furnace 1, the valve 7 is shut to avoid disturbing the gas in the manifold 6 from the other furnace(s) in the carbonization phase.

The furnace 1 can therefore be separated from the installation by removing the removable chimney sleeve 5.

The operator can then proceed to carry out the discharge operation.

By operation of screwjacks 31 situated at the four corners of a mobile frame 33 attached to the drum of the furnace 29 a differential space is created relative to a fixed frame 32 to which is attached a set of wheels 34 running on two rails 35.

The furnace is lifted off the refractory concrete 30 on which it rested during the drying and then carbonization operations.

A few millimeters lift is sufficient to enable the furnace to be pushed onto the rails.

The charcoal slides along the ground and is tipped into a container 36 situated in a ditch.

On completing the discharge operation, the furnace is pushed back to its original position. Carrying out the converse operations, the jacks are released and the furnace is ready for further operation and to receive a lining of wood, after the removable lid 37 is removed by means of the telescopic boom 38.

It is obvious that any other lifting and mobility arrangements may be used, for the boom and/or the furnaces, without departing from the scope of the present invention.

At the same time, an airtight cover is fitted to the container in order to snuff out the still incandescent charcoal.

The full container is moved to a cooling off area while another empty container is put in its place to undergo the same operations on discharging the furnace 2.

An ideal installation operates continuously with four standard modules like the one shown in FIG. 2.

There is then achieved continuous operation including thorough drying and fast and complete carbonization.

We claim:

1. Charcoal manufacturing device comprising at least two bottomless furnaces of which, in operation, at least one is in a carbonization phase and at least one other is charged with wet wood to be dried, an incinerator for burning gas produced during the carbonization phase connected to said at least one furnace, a first hot gas diluter connected to said incinerator, an extractor connected to said first diluter, an optional washing device connected to said extractor, means for taking off hot gas produced by said at least one furnace during the carbonization phase upstream of said extractor, said take-off means being connected to said at least one other furnace, and a second hot gas diluter in said take-off means adapted to render the temperature of said hot gas compatible with said wet wood to be dried.

2. Device according to claim 1, comprising a refractory concrete slab on which said at least two furnaces are disposed.

3. Device according to claim 1, comprising a retractable sleeve chimney at the top of said at least one furnace having two channels of which one is adapted to direct the hot gas to said incinerator when said at least one furnace is the carbonization phase.

4. Device according to claim 1, comprising a pipe on said incinerator and a conical diluter on said pipe adapted to take in a quantity of air sufficient to reduce the temperature from that at the incinerator outlet to a value of 200° C. or less.

5. Device according to claim 1, wherein said washing device includes a washing column, a receiving tank in which said washing column is partially immersed when filled with water to constitute an hydraulic trap and sprayers on said washing column.

6. Device according to claim 1, further comprising distribution trunking, a fan, an outlet pipe from said incinerator and a branch connection from said outlet pipe to said trunking, whereby some of the diluted hot gas is conveyed to said at least one other furnace.

7. Device according to claim 2, wherein said at least one other furnace comprises a hot gas inlet at the bottom, formed in said slab.

8. Device according to claim 6, wherein said branch connection incorporates a conical diluter adapted to reduce the incinerator outlet temperature of between 900° and 1 000° C. to a temperature below that at which wood ignites.

9. Device according to claim 6, wherein said outlet pipe incorporates additional branch connections each equipped with a conical diluter to take off hot gas.

10. Device according to claim 1, wherein each of said at least two furnaces incorporates a telescopic metal frame in two parts of which one is fixed to the periphery of the furnace and the other includes a set of four wheels, and further comprising a general distribution frame, rails on said frame on which said wheels roll and four actuators for adjusting the relative positions of said two parts of said frame.

11. Device according to claim 10, further comprising a ditch at the end of said rails and a container in said ditch of sufficient volume to accommodate all the charcoal produced by said at least one furnace.

12. Device according to claim 11, wherein said container has an airtight lid whereby it can snuff out incandescent charcoal.

13. Device according to claim 1, further comprising, for each furnace or each of at least one set of furnaces, a tubular column, a right-angle boom at the top of said column, a lid on the furnace, fixed to said boom, a sealing groove in each furnace adapted to cooperate with said lid, a sleeve of larger diameter than said column in which said column is mobile, a hydraulic jack for raising and lowering said column and a handle on said column whereby gyratory movement may be imparted to said lid so that said lid can be removed from said furnace to provide access to its interior.

* * * * *